Nov. 11, 1924.
A. HIRTH
CRANK SHAFT
Filed Dec. 22, 1920
1,514,768
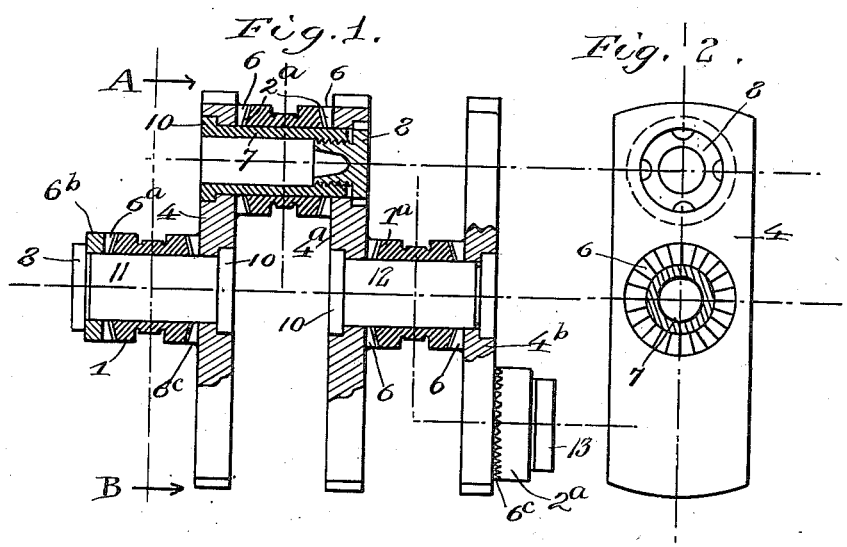
INVENTOR.
Albert Hirth
BY
Rogers, Kennedy Campbell
ATTORNEYS.

Patented Nov. 11, 1924.

1,514,768

UNITED STATES PATENT OFFICE.

ALBERT HIRTH, OF CANNSTATT-STUTTGART, GERMANY, ASSIGNOR TO AKTIEBOLAGET SVENSKA KULLAGERFABRIKEN, OF GOTTENBORG, SWEDEN, A CORPORATION OF THE KINGDOM OF SWEDEN.

CRANK SHAFT.

Application filed December 22, 1920. Serial No. 432,445.

*To all whom it may concern:*

Be it known that I, ALBERT HIRTH, a citizen of Germany, residing at Cannstatt-Stuttgart, Germany, have invented certain new and useful Improvements in Crank Shafts, of which the following is a specification, reference being had therein to the accompanying drawing.

My invention refers to crank shafts, and more especially to crank shafts composed of a plurality of parts.

In high speed internal combustion engines for flying-machines, motor cars, launches, and the like, it is the aim to achieve increased reliability in working together with reduced resistances due to friction, and economy of fuel as well as of lubricating oil. In consideration of these points it appears desirable to employ ball bearings or roller bearings for the main bearings of the motor.

It is, however, very difficult to use such bearings with the customary multi-crank shafts. Either the bushes must be divided, or they must be made disproportionately large, so as to allow of bringing them into position between the crank webs. Both methods are known to present considerable disadvantages.

Another possibility would consist in building up the crank shaft itself from a number of separate component parts which would not be assembled until after the ball races had been slipped onto the parts of the shaft running in the bearing.

Experiments to this effect have already been made, but such built up shafts have not proved satisfactory owing to their giving rise to considerable trouble at the points of connection between the various parts. The connections either began to slacken during the working of the engine and required constant supervision and repairing or, on the other hand, were too hard to undo, if such a necessity arose, or too liable to damage when being taken to pieces, so that it became impossible to fit them together again accurately afterwards.

My invention now presents a new method of building up multi-crank shafts from individual component parts which possesses the advantages offered by the built-up shaft, without having the disadvantages mentioned above. My invention substantially consists in employing joints shaped in a particular manner for connecting the crank pins and the journals with the crank web, the joints being constituted by teeth on the ends of the crank pin engaging and interlocking with corresponding teeth on the inner faces of the crank webs, with the sides of the individual teeth sloping outwardly to their base, and the parts being suitably connected in fixed relations, as for instance by means of a bolt extending through the crank pin and engaged with the crank webs.

In the accompanying drawings:

Fig. 1 is a sectional elevation of a crank shaft constructed in accordance with my invention.

Fig. 2 is a transverse section of the same on the line A—B as viewed in the direction of the arrows.

Referring to the drawings:

The circular journal or crank pin 2 is connected with the flat crank webs 4 and $4^a$ by means of teeth $2^a$ on the opposite ends of the crank pin, which teeth engage and interlock with two circular series of teeth 6 projecting inwardly from the inner faces of the crank webs. The crank pin 2 is hollow, and through it and two aligned openings in the two crank webs, extends a locking bolt in the form of a hollow sleeve 7 and a head 8 screwed into the end of the sleeve. At its end the sleeve 7 is provided with an annular head 10 which is countersunk in the outer side of web 4, and the head 8 is likewise countersunk in the outer side of web $4^a$, so that when the head is screwed into the sleeve, the through bolt will be caused to engage the two webs and will draw them inwardly and force their teeth into interlocking engagement with the teeth on the ends of the crank pin and thereby will hold the parts fixedly and rigidly in position. Inward of the crank pin 2 the webs have connected with them in a manner similar to the connection of the crank pin 2, additional crank pins 1 and $1^a$. The teeth on the outer end of the crank pin 1 engage and interlock with teeth $6^a$ on the inner face of a washer $6^b$, and the teeth on the inner end of the crank pin interlock and engage with teeth $6^c$ projecting outwardly from the crank web 4, these parts being connected together by a through bolt 11 similar in form and construction to that first described. The crank pin 1ª at the right is similarly formed and similarly connected between the other web 4ª and the third web 4ᵇ by means of a through bolt 12 similar to the other through bolts. This latter web 4ᵇ has a crank pin 2ª connected with its outer side, the said crank pin being provided, similar to the other crank pins, with end teeth which engage and interlock with similar end teeth 6ᶜ projecting outwardly from the face of the web 4ᵇ, the parts being connected together by a through bolt 13.

The crank pins 1, 1ª and 2 are adapted to serve as the inner races of roller or ball bearings and they serve as well as the bearings of the crank shaft itself.

In the construction shown, the crank pins constituting the inner races for the roller or ball bearings are very short, and a corresponding saving in high grade steel is thus effected. The width of the crank webs also is very small. Moreover the whole construction is pleasing to the eye in consequence of the countersinking of the heads 8 and 10 of the through bolts. The comparatively large outer diameter of the toothed portions of the crank pins and webs, has the advantage of making the length of the crank web between the toothed portions very short. Since it is this part of the crank web which is exposed to the greatest elastic deformation, owing to the effect of the forces acting upon it, the amount of these deformations is reduced to a minimum owing to the supporting action of the two surfaces, thus materially increasing the life of a shaft built up in this manner. The shape and circular pitch of the teeth is chosen to suit the individual case. The circular pitch is in this case chosen with due regard to the fact that it should correspond to the angles at which the various cranks of the crank shaft must be arranged in respect of one another.

The whole design offers absolute accuracy as regards the necessity of all of the crank pins or journals being parallel, and all of the bearing journals being on one and the same axis, if the component parts are manufactured on special machines suited for the purpose. This is an additional advantage in comparison with the methods of manufacturing multi-crank shafts hitherto practised; it being customary to subject such multi-crank shafts to considerable finishing operations as it is not possible to manufacture them with accuracy in the first instance.

It is to be noted that the teeth on the ends of the crank pins and the teeth on the faces of the webs which interlock therewith, have sharp edges and that the sides of the individual teeth slope outwardly from these edges to the base of the teeth as indicated on the crank pin 2ª at the lower right-hand portion of Fig. 1. The interlocking teeth of this form on the webs and crank pins, brings about a very positive locking of the parts when the through bolts are drawn up, as the sloping surfaces of the teeth act with a wedging effect on each other and insure an absolute final positioning of the parts without looseness or liability of displacement.

I claim:

1. A built up crank shaft comprising in combination, two crank webs and an intermediate crank pin, the inner faces of said webs being provided with sharp edged teeth projecting inwardly therefrom, and the end faces of said pin being provided with similarly formed teeth engaging the teeth on the webs.

2. A built up crank shaft comprising in combination, two crank webs and an intermediate crank pin, the end faces of said pin and the inner faces of said webs being provided with sharp edged teeth in interlocking engagement with each other, and a through bolt extending into the said crank pin and engaging the webs to firmly hold said teeth in permanent engagement substantially as set forth.

3. A built up crank shaft comprising in combination, two crank webs and an intermediate crank pin, the end faces of said pin and the inner faces of said webs being provided with sharp edged teeth in interlocking engagement with each other, and a through bolt extending into the said crank pin and engaging a web to firmly hold said faces in permanent engagement, the said crank pin being shaped so as to form the inner ball race of an anti-friction bearing substantially as set forth.

4. A built up crank shaft comprising in combination, two crank webs and an intermediate crank pin, the inner faces of said webs having sharp edged teeth extending inwardly therefrom with the sides of the individual teeth sloping outwardly to the base, and the end faces of said pin being provided with similarly formed teeth engaging the teeth on the webs, and a through bolt engaging the webs and acting to force the teeth into interlocking engagement with each other.

In testimony whereof, I have affixed my signature hereto.

ALBERT HIRTH.

CERTIFICATE OF CORRECTION.

Patent No. 1,514,768.  Granted November 11, 1924, to

ALBERT HIRTH.

It is hereby certified that the above numbered patent was erroneously issued to "Aktiebolaget Svenska Kullagerfabriken, of Gottenborg, Sweden, a corporation of the Kingdom of Sweden", as assignee of the entire interest in said invention, whereas said patent should have been issued to the inventor said "Hirth and Aktiebolaget Svenska Kullagerfabriken, of Gottenborg, Sweden,, a corporation of the Kingdom of Sweden", said corporation being assignee of one-half interest only in said invention, as shown by the records of assignments in this office; and that the said Letters Patent should be read with this correction therein that the same may conform to the record of the case in the Patent Office.

Signed and sealed this 11th day of December, A. D. 1928.

M. J. Moore,
Acting Commissioner of Patents.

(Seal)